United States Patent
Fruin et al.

(10) Patent No.: US 8,266,366 B2
(45) Date of Patent: *Sep. 11, 2012

(54) MEMORY DEVICE OPERABLE IN READ-ONLY AND WRITE-ONCE, READ-MANY (WORM) MODES OF OPERATION

(75) Inventors: Richard Matthew Fruin, San Jose, CA (US); Christopher S. Moore, San Jose, CA (US); Samuel Y. Yu, San Francisco, CA (US)

(73) Assignee: SanDisk Technologies, Inc., Plano, TX (US)

(*) Notice: Subject to any disclaimer, the term of this patent is extended or adjusted under 35 U.S.C. 154(b) by 347 days.

This patent is subject to a terminal disclaimer.

(21) Appl. No.: 12/421,238

(22) Filed: Apr. 9, 2009

(65) Prior Publication Data

US 2010/0017559 A1    Jan. 21, 2010

Related U.S. Application Data

(60) Provisional application No. 61/044,410, filed on Apr. 11, 2008, provisional application No. 61/057,672, filed on May 30, 2008.

(51) Int. Cl.
*G06F 12/00*    (2006.01)

(52) U.S. Cl. .......... 711/103; 711/E12.001; 711/E12.008

(58) Field of Classification Search .................. 711/103, 711/170, E12.001, E12.008
See application file for complete search history.

(56) References Cited

U.S. PATENT DOCUMENTS

| | | |
|---|---|---|
| 5,404,485 A | 4/1995 | Ban |
| 6,014,745 A | 1/2000 | Ashe |
| 6,034,882 A | 3/2000 | Johnson et al. |
| 6,182,188 B1 | 1/2001 | Hasbun et al. |
| 6,424,581 B1 | 7/2002 | Bosch et al. |
| 6,545,891 B1 | 4/2003 | Tringali et al. |
| 6,763,424 B2 | 7/2004 | Conley |
| 6,895,490 B1 | 5/2005 | Moore et al. |
| 6,941,403 B2 * | 9/2005 | Cedar et al. ................... 710/301 |
| 6,968,459 B1 | 11/2005 | Morgan et al. |
| 7,000,063 B2 | 2/2006 | Friedman et al. |
| 7,139,864 B2 | 11/2006 | Bennett et al. |
| 7,188,228 B1 | 3/2007 | Chang et al. |
| 7,747,661 B2 | 6/2010 | Hsu et al. |
| 2006/0047920 A1 | 3/2006 | Moore et al. |
| 2006/0179328 A1 | 8/2006 | Lii |
| 2006/0242064 A1 | 10/2006 | Jogand-Coulomb et al. |
| 2007/0094468 A1 | 4/2007 | Haustein et al. |

(Continued)

OTHER PUBLICATIONS

International Search Report and Written Opinion for PCT/US2010/049141, dated May 16, 2011, 15 pages.

(Continued)

*Primary Examiner* — Hoai V Ho
(74) *Attorney, Agent, or Firm* — Brinks Hofer Gilson & Lione

(57) ABSTRACT

One-time programmable (OTP) and write-once read-many (WORM) memory devices and methods for use therewith are provided. These embodiments can be used to provide compatibility between a memory device that uses an OTP (or few-time programmable (FTP)) memory array and host devices that use a file system, such as the DOS FAT file system, that expects to be able to rewrite to a memory address in the memory device. These embodiments can also be used to prevent accidental or deliberate overwrites, changes, or deletions to existing data in a WORM memory device.

50 Claims, 4 Drawing Sheets

U.S. PATENT DOCUMENTS

| | | | |
|---|---|---|---|
| 2007/0094470 A1* | 4/2007 | Haustein et al. | 711/163 |
| 2008/0010685 A1 | 1/2008 | Holtzman et al. | |
| 2009/0010117 A1* | 1/2009 | Kobayashi et al. | 369/47.14 |
| 2009/0043963 A1* | 2/2009 | Lahcanski et al. | 711/115 |
| 2009/0172321 A1* | 7/2009 | Scheuerlein et al. | 711/161 |
| 2010/0017558 A1 | 1/2010 | Fruin et al. | |
| 2010/0017559 A1 | 1/2010 | Fruin et al. | |

OTHER PUBLICATIONS

Invitation to Pay Fees for PCT/US2010/049141, dated Jan. 28, 2011, 5 pages.

"One-Time Programmable (OTP) Memory Device and Methods for Use Therewith," U.S. Appl. No. 12/421,229, filed Apr. 9, 2009, inventors: Matt Fruin, Christopher S. Moore, and Samuel Y. Yu.

"Authentication and Securing of Write-Once, Read-Many (WORM) Memory Devices," U.S. Appl. No. 12/572,991, filed Oct. 2, 2009, inventors: Samuel Y. Yu, Christopher S. Moore, Jason S. Whetstone, Ron Barzilai, and Hironaga Ino.

Office Action for U.S. Appl. No. 12/421,229, dated Aug. 9, 2011, 28 pages.

Office Action for U.S. Appl. No. 12/572,991, dated Feb. 14, 2012, 6 pages.

Office Action for U.S. Appl. No. 12/421,229, dated Apr. 30, 2012, 21 pages.

* cited by examiner

MEMORY DEVICE OPERABLE IN READ-ONLY AND WRITE-ONCE, READ-MANY (WORM) MODES OF OPERATION

CROSS-REFERENCE TO RELATED APPLICATIONS

This application claims the benefit of U.S. Provisional Application No. 61/044,410, filed Apr. 11, 2008, and U.S. Provisional Application No. 61/057,672, filed May 30, 2008, both of which are hereby incorporated by reference.

BACKGROUND

Portable memory devices, such as memory cards, are often used with consumer electronic devices, such as mobile phones and personal computers (PCs), to store and/or transport data. In addition to a storage medium, many portable memory devices contain circuitry, such as a microprocessor or controller, that can transform logical addresses received from the host device to physical addresses used by the memory device, thereby allowing the circuitry on the memory device to control where data is stored in the storage medium.

Many memory devices use a rewritable memory, which allows a memory address to be erased and rewritten for system or user purposes. However, other memory devices use a one-time programmable (OTP) memory array. In an OTP memory array, once a memory cell at a memory address is changed to a programmed state, it cannot be changed back to its original, unprogrammed state. Because of this limitation on the number of times a memory address can be written, memory devices with OTP memory arrays may not be compatible with host devices that use the popular DOS FAT file system or other file systems that expect to be able to rewrite to a memory address. A similar problem occurs, to a lesser extent, with memory devices that use a few-time programmable (FTP) memory array, whose memory cells can be written more than once but not as many times as memory cells in a rewritable memory array.

Another type of memory device is a write-once, read-many (WORM) memory device. This memory device is not rewritable, so that data, once written, cannot be later changed, erased, or overwritten. This is useful for applications where data reliability and security are paramount, such as archival document storage or permanent record-keeping.

DETAILED DESCRIPTION OF THE PRESENTLY PREFERRED EMBODIMENTS

Figure 1:
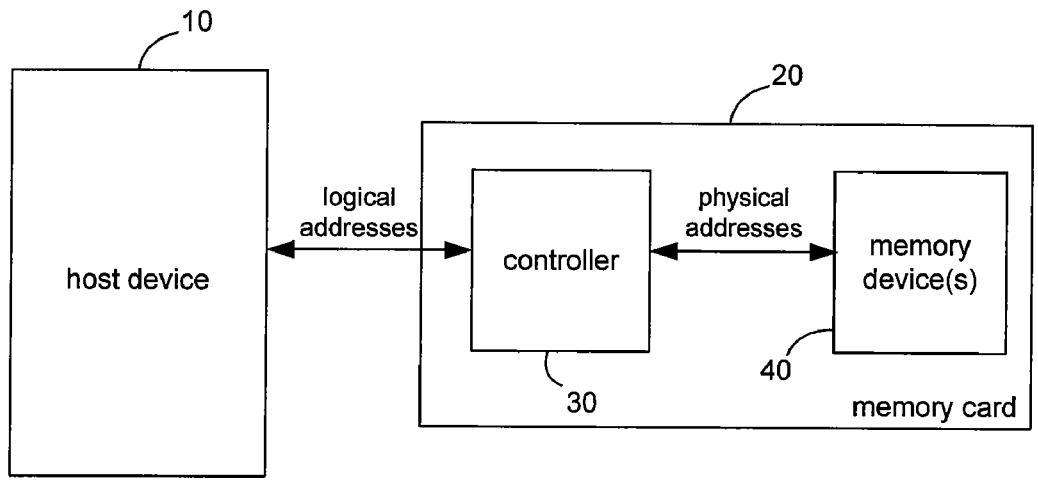
FIG. 1 is an illustration of a host device in communication with a memory device of an embodiment.

By way of introduction, the following embodiments relate generally to providing compatibility between a memory device that uses a one-time programmable (OTP) (or few-time programmable (FTP)) memory array and host devices that use a file system, such as the DOS FAT file system, that expects to be able to rewrite to a memory address in the memory device. An OTP memory is a memory in which memory cells are fabricated in an initial, un-programmed digital state and can be switched to an alternative, programmed digital state at a time after fabrication. For example, the original, un-programmed digital state can be identified as the Logic 1 (or Logic 0) state, and the programmed digital state can be identified as the Logic 0 (or Logic 1) state. Because the memory cells are OTP, an original, un-programmed digital state of a storage location (e.g., the Logic 1 state) cannot be restored once switched to a programmed digital state (e.g., the Logic 0 state). In contrast, an FTP memory is a memory in which memory cells can be written to more than once but not as many times as a typical rewritable (or write-many) memory array.

Many techniques can be used to make a OTP memory device compatible with a rewritable file system of a host device. In one technique, the memory device is configured to behave exactly the same as a standard flash rewritable memory device until the memory is fully consumed, at which point the memory device would stop performing write operations. Until the memory is consumed, the memory device is essentially indistinguishable from a normal rewritable memory device. In this way, such a memory device would be backwards-compatible with existing host applications and devices. U.S. Patent Application Publication No. US 2006/0047920 and U.S. Pat. No. 6,895,490, which are both hereby incorporated by reference, provide further details on backwards-compatible memory devices. However, for certain hosts and certain host behaviors, there may be a danger of corner cases where the host might attempt to write data to the memory device, but the memory device would run out of memory and not be able to store the data (a typical example would be a digital camera attempting to store a picture on a memory card). In the worst case, the host device would not even realize the write had failed and would give no indication to the user that there was a problem.

To avoid this risk (and the accompanying negative end-user perception), the following embodiments provide a memory device that leverages the existing definition of a read-only memory (ROM) card type, provide read compatibility with existing host devices (such as existing SecureDigital (SD) host devices), and minimize the effort to modify host devices to write to an OTP memory device. In one presently preferred embodiment, the memory device takes the form of an SD memory card, based on OTP memory, that operates in accordance with a formal OTP card type specification set forth by the SecureDigital (SD) Association. Various features of these embodiments include, but are not limited to, the following:

- A memory device that powers up in a read-only memory (ROM) mode to be compatible with existing specifications and readable in existing SD-compliant host devices.
- A memory device that implements a new function (using a protocol defined in the SD specifications) to switch the memory device into a read/write (R/W) mode. When in R/W mode, the memory device generally behaves like a standard rewritable (e.g., flash) card, so minimal changes are needed for host devices to implement support for the OTP card.
- Because, unlike a rewritable memory, an OTP memory is finite and can be fully consumed, in one embodiment, the memory card defines a new command (preferably compliant with the definition in the SD specifications) for the host device to track physical memory consumption.

Additional modifications for operations that program registers due to the limitations of OTP memory (as compared to rewritable memory) are also provided.

Turning now to the drawings, FIG. 1 is an illustration of a host device 10 in communication with a memory card 20 of an embodiment. As used herein, the phrase "in communication with" means in direct communication with or in indirect communication with through one or more components, which may or may not be shown or described herein. In this particular illustration, the host device 10 is in communication with the memory card 20 via mating ports. It should be noted that although a memory card 20 is being used for illustration in FIG. 1, a memory card 20 is just one example of a memory device that can be used with these embodiment. In general, a "memory device" can take any suitable form, such as, but not limited to, a memory card, a Universal Serial Bus (USB) device, and a hard drive. In one presently preferred embodiment, the memory device takes the form of a solid-state memory card, such as a SecureDigital (SD) memory card.

As shown in FIG. 1, in this embodiment, the memory card 20 comprises a controller 30 in communication with one or more memory devices 40. The memory device(s) 40 can comprise any suitable type of memory, such as, but not limited to, solid state, optical, and magnetic memory. In one embodiment, at least some of the memory device(s) 40 comprise OTP and/or FTP memory. In the event that multiple memory devices 40 are used, it should be understood that the various memory devices can each use the same or different memory technologies (e.g., (i) all OTP, (ii) OTP and FTP, or (iii) OTP, FTP, and rewritable). Preferably, the memory device 40 comprises a field-programmable solid-state memory array. The memory cells in the memory array can be organized in a two-dimensional or three-dimensional fashion. In one preferred embodiment, the memory array is a three-dimensional array, such as an array described in U.S. Pat. No. 6,034,882 to Johnson et al., which is hereby incorporated by reference.

The controller 30 is operative to perform various functions, some of which are described below. While a controller 30 is shown in FIG. 1, it should be understood that the memory card 20 can comprise any suitable circuitry 130. As used herein, "circuitry" can include one or more components and be a pure hardware implementation and/or a combined hardware/software (or firmware) implementation. Accordingly, "circuitry" can take the form of one or more of a controller, microprocessor, or processor that executes computer-readable program code (e.g., software or firmware stored in the memory device(s) 40, logic gates, switches, an application specific integrated circuit (ASIC), a programmable logic controller, and an embedded microcontroller, for example.

Also, a "host device" refers to any device that can be put in communication with a memory device and be used to store data in the memory device and/or read data from the memory device. Examples of host devices include, but are not limited to, consumer electronic devices such as mobile phones, digital media players, digital cameras, game devices, personal computers (e.g., desktop or portable (such as laptop or notebook) computers), email and/or text messaging devices, and personal digital assistants (PDAs). A host device can be a relatively mobile device (such as a mobile phone) or a relatively stationary device (such as a desktop personal computer).

In this embodiment, the OTP memory card 20 implements two modes of operation. In the first mode, the memory card 120 powers up in a configuration compatible with an existing ROM card definition already defined in the SD specifications (and, therefore, supported by compliant SD host devices). In the second mode, the memory card 20 is switched into a writable mode before accepting and performing writes. (A suitable ROM card configuration and behavior are described in the SD Part 1 Physical Layer Specifications v2.00, as well as in the Part 1 Physical Layer Specification version 2.00 Supplementary Notes version 1.00. The switch command protocol was defined in the SD specifications for the general situation of enabling expanded or additional features for an SD card (see section 4.3.10 of the SD Part 1 Physical Layer Specification, version 2.00.).) By powering up in a read-only mode that is compatible with an existing card definition, existing host devices can still read from the memory card 20 but cannot write to the memory card 20, providing read compatibility with existing host devices but avoiding the dangers that those non-enabled host devices will write to the memory card 20 and run into the problematic corner case discussed above.

Figure 2:
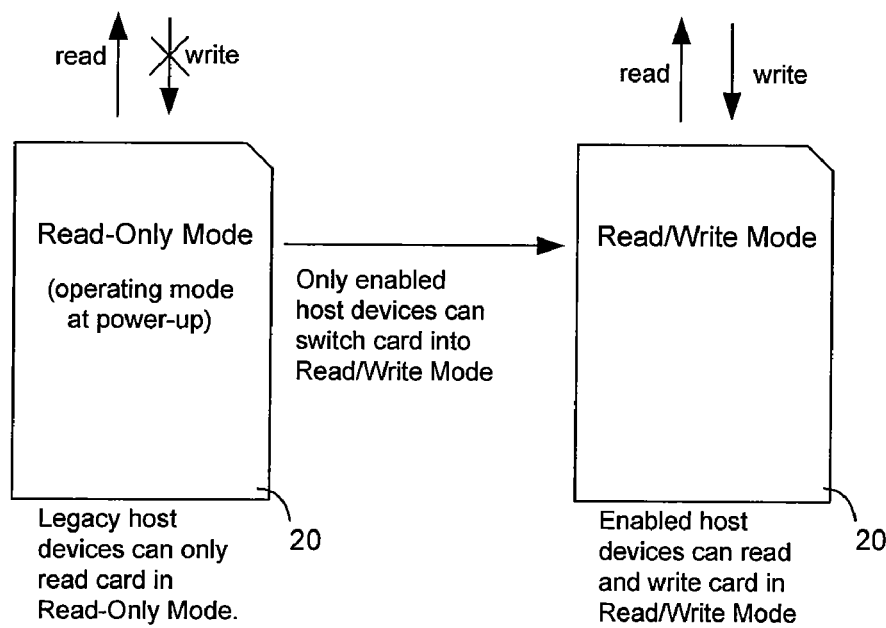
FIG. 2 is an illustration of a dual-mode behavior of a memory device of an embodiment.

Because, in this embodiment, host devices must issue a command to switch the memory card 20 into a writable mode, only host devices that have been enabled to work with the OTP memory card 20 and understand its unique features will be able to write to it. FIG. 2 illustrates the memory card's 20 dual-mode behavior. The left-hand illustration in FIG. 2 shows that (1) the memory card 20 powers up in a read-only mode so legacy host devices can only read from the card 20, (2) only enabled host devices know how to switch the card 20 into a read/write mode, and (3) in read/write mode, enabled host devices can both read and write to the card 20.

In its writable mode, the memory card 20 behaves similarly to a "normal" flash rewritable memory card, at least until the memory card's OTP memory 40 is fully consumed. So, for example, if the host device 10 overwrites a sector of data with different data (which is often done for rewritable memory cards for a variety of reasons), the memory card 20 accepts and performs the requested write operation. (Because the underlying memory device 40 is OTP in this embodiment, memory on the device 40 itself cannot be changed after being written, but the card 20 firmware can automatically write updated data to a new location in memory and "remap" the old location to the new location. This remapping functionality is similar to the remapping that occurs in firmware in existing flash memory devices (see, for example, U.S. Pat. No. 7,139,864, which is hereby incorporated by reference).) This "overwrite" behavior ensures that there are minimal changes that the host device 10 must make to support the OTP memory card 20. The host device 10 can use any file system (most use the industry-standard FAT file system) and can still perform all the operations that it does for rewritable memory cards, including file rename, change, and delete operations, for example.

Figure 3:
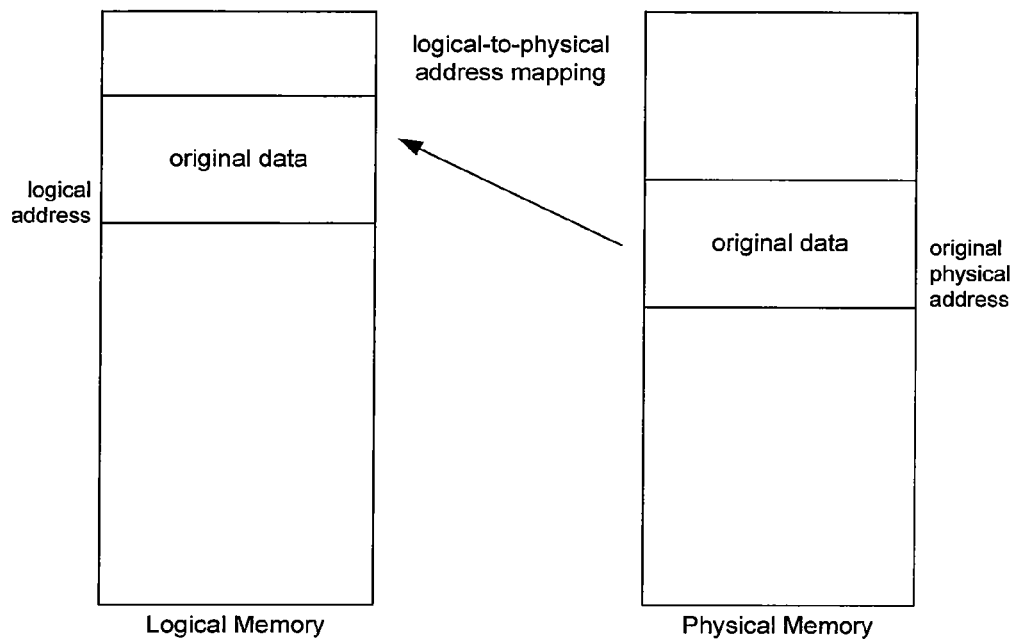
FIGS. 3 and 4 are illustrations of how a controller of a memory device of an embodiment makes logical memory appear rewritable even though the underlying memory is one-time programmable.
Figure 4:
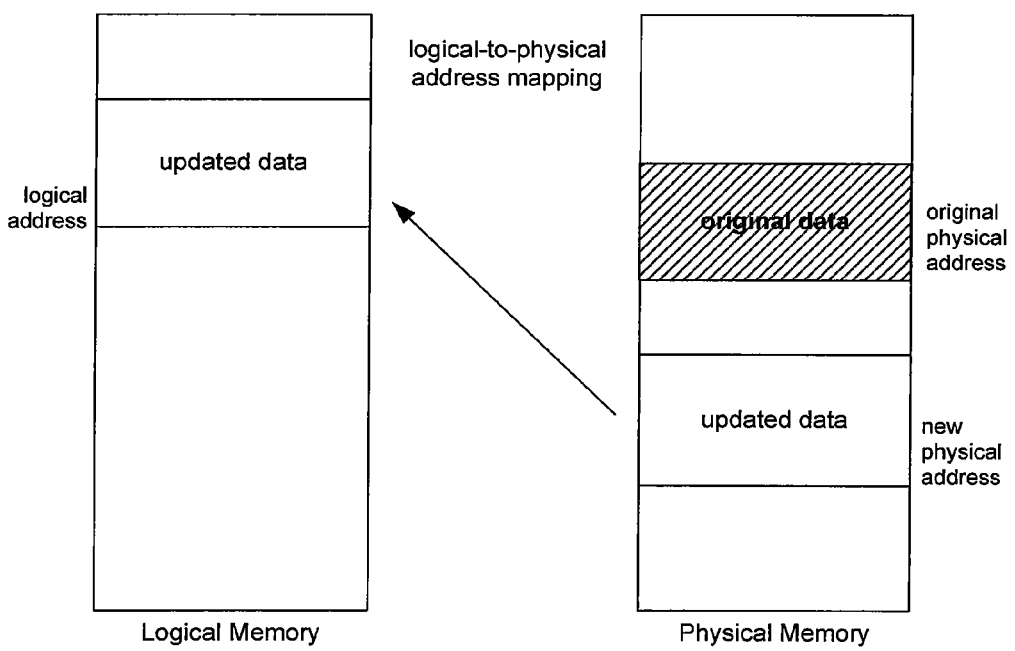

With reference again to FIG. 1, the host device 10 interfaces to the memory card 20 using logical addresses, the controller 30 acts as the interface between the host device 10 and the physical memory device(s) 40 and performs logical-to-physical addressing. The interface between the controller 30 and the memory device(s) 40 uses physical addresses. This interface implementation is standard to existing flash memory devices (see, for example, U.S. Pat. No. 7,139,864, which is hereby incorporated by reference). FIGS. 3 and 4 demonstrate how the controller 30 makes the logical memory appear rewritable even though the underlying memory 40 is OTP. FIG. 3 shows that original data stored at a logical address is stored in a physical location within the memory device 30. FIG. 4 shows that when the host device 10 overwrites the data at the logical address, the new updated data is stored at a new physical address, and the controller 30 updates its logical-to-physical addressing to reference the updated data instead of the now super-ceded original data. Again, the process is similar to the existing flash memory device implementation noted above; however, a difference between this embodiment and the flash implementation is that the memory 40 in this implementation (here, OTP) is not erased and re-used.

In its writable mode, the memory card 20 implements a new command (Read_Mem_Remaining) for the host device 10 to track the amount of physical (OTP) memory remaining. (The command code was allocated and defined in the SD Part 1 Physical Layer Specification, version 2.00, section 4.3.12 Command System as part of the switch command protocol, but the data values and format was defined specifically for the OTP card application.) The following table lists the values returned by the Read_Mem_Remaining, in a presently preferred embodiment (of course, other implementations can be used). Values are preferably returned in most-significant-byte, most-significant-bit order.

| Byte Position | Parameter | Description |
| --- | --- | --- |
| 511:508 | Main Area Remaining | Amount of memory remaining in the "main" area of the card. Reported in units of sectors (200 h bytes). |
| 507:504 | Reserve Area Remaining | Amount of memory remaining in the "main" area of the card. Reported in units of sectors (200 h bytes). |

By making the host device 10 responsible for tracking memory consumption, the memory card 20 definition avoids the problem with the original OTP card implementation, where the card tries to discern what the host device is doing and why. With this new definition, the memory card 20 is free to accept and perform all write operations, since only enabled host devices will be able to write to it, and they are responsible for tracking memory consumption and avoiding illegal operations.

In this embodiment, the first two values returned by the new command ("main" and "reserve") report to the host device 10 the amount of physical space remaining on the card 20 (1) for general/unspecified uses (file data and file system operations) (the "main area") and (2) that is reserved for file system operations only (no file data) (the "reserved area"). The main value was defined so that the host device 10 can use it the same way it currently uses the FAT tables: to both determine how many more files (or, more generally, how much more data) can be written to the card 20 and to decide when the card 20 is full and the host device 10 should stop writing data to the card 20. The reserve value was defined so that the host device 10 would always be able to perform the file-system related operations necessary to complete a file that had been in progress when the card 20 was completely consumed (as reported by the main area), in the same way as it does for the FAT file system structures. This minimizes the changes a host device 10 must make in order to support OTP cards in addition to rewritable cards.

Figure 5:
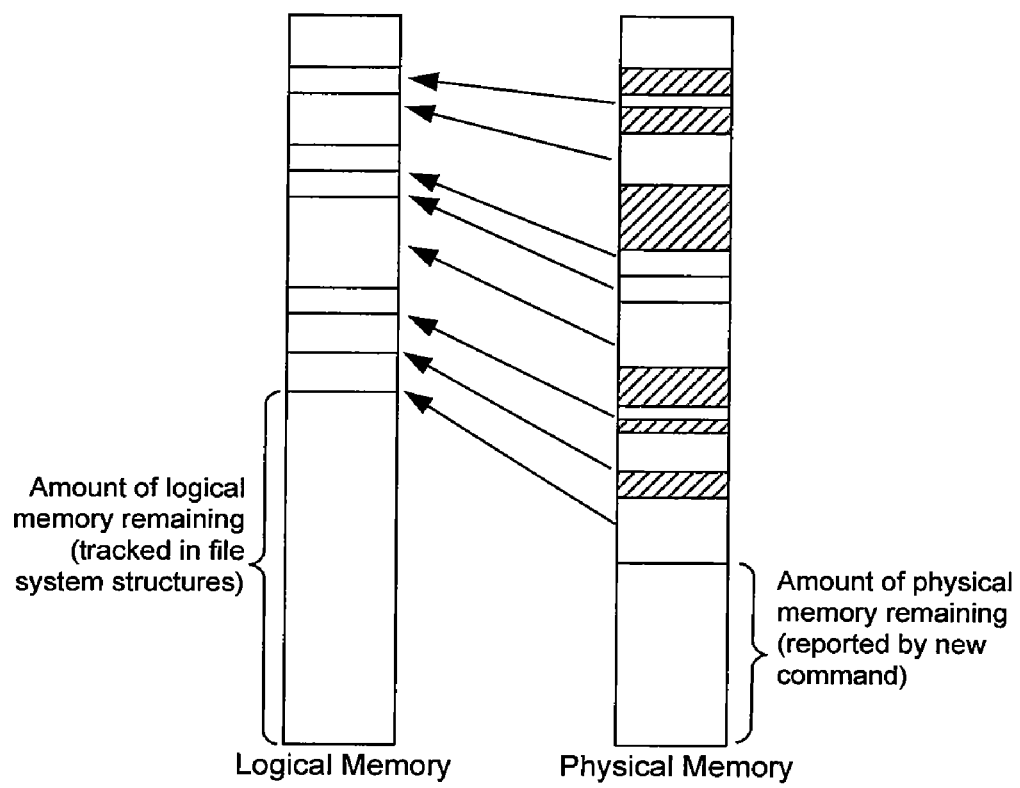
FIG. 5 is an illustration of a relationship between logical memory and physical memory of an embodiment.

FIG. 5 illustrates the relationship between logical memory (visible to the host device 10) and the physical memory 40 (not directly visible to the host device 10). The amount of unused logical memory is tracked by file system structures, typically a "File Allocation Tables" for the standard FAT file system. The controller 30 in the memory card 20 manages logical-to-physical addressing. Overwritten data, which is represented is this diagram by cross-hatches, is no longer referenced but still consumes physical memory. The controller 30 reports the amount of physical memory remaining using a new command, so the host device can determine the amount of space available. The amount of physical memory remaining may be smaller or larger than the amount of logical memory remaining.

In this embodiment, the behavior of "Program_CSD" and "Lock_Unlock" commands are also modified to reflect the fact that the card memory 40 is OTP and not rewritable. That is, these commands are preferably used only once to update/program the related registers. The Card Status Defaults (CSD) register reports the card's 20 operating conditions and supported commands and features. It also includes a small number of writable bits that are used to indicate the card's 20 write protect status and if the card 20 is original data or is a copy. These bits can only be set once, collectively; if any bits are changed by issuing the Program_CSD command, then the command can not be used again to further update the CSD register. The Lock_Unlock command is used to both set the card 20 password and to supply the password to later unlock the card 20. For the OTP card 20, the password can only be set once and, once set, can never be changed or cleared. If the password has been set, then this has implications on the future behavior of the card 20 as required by the SD specifications. Also, the OTP card 20 preferably does not support the "force erase" operation described in the SD specifications, where if the password is forgotten, the card 20 can be completely erased (clearing the password), because the OTP card 20 does not support the erase operation. Specifying that these two registers can be changed only once each achieves two purposes. First, it fixes the amount of space the card 20 must reserve in order to store the update register value, and, second, it allows the host device 10 to determine if the register has already been changed or not (if the register does not match its default value, it must have been modified, and since it has been modified, it may not be modified again). This would obviously not be true if the host device 10 could change the register values more than one time.

As noted above, the examples described herein are only some of the many implementations these embodiments can take. Also, while the use of OTP memory was used in these examples, it should be noted that the teachings described herein can also be applied to FTP memories. Further, although the memory card 20 in these embodiments took the form of an SD card, as mentioned above, any suitable type of memory device can be used, including, but not limited to, those in compliance with MultiMedia, Memory Stick, Compact Flash, Smart Media, xD, USB, or HS-MMC specifications.

As another alternative, the above embodiments can be modified to add features to prevent accidental or deliberate overwrites, changes, or deletions to existing data in a write-once, read-many (WORM) memory device. Preferably, these features are implemented in firmware logic and algorithms and do not rely on any particular memory type. Accordingly, a WORM memory card can be built using either one-time programmable (OTP), few-time programmable (FTP), or read/write memory devices, and can be built using standard two-dimensional flash memory or three-dimensional memory. (More generally, any of the embodiments described herein, including the OTP embodiments described above, can be built using any type of memory (e.g., OTP or rewritable) because, in these embodiments, it is the controller that makes a card "OTP" or "WORM" and not the underlying memory.)

In general, a WORM card is designed for OEM/industrial applications where data reliability and security are paramount, such as when storing digital still images, video images, and audio recordings used for police evidence; point-of-sale receipts for tax collection purposes; and long-term storage of financial records. For these and other applications, the WORM card's ability to ensure the integrity and safety of data written to the card is its primary attribute. Accordingly, features that prevent accidental or deliberate overwrites, changes, or deletions to existing data are desired. This embodiment uses some of the features of the OTP embodiment described above while adding additional features. Specifically, like the OTP card, the WORM card of this embodiment:

Powers-up in a read-only mode, compatible with the defined "ROM" SD memory card type, and readable in existing SD-compliant host devices.

Requires the host device to switch the card into a different mode (here, a read/write WORM mode, which is different from the OTP mode used in the OTP card); the WORM mode implements additional features noted below to ensure data integrity.

Implements a similar command as the OTP card for the host device to track physical memory consumption.

Behaves in a similar manner as the OTP card for the Program_CSD and Lock/Unlock commands.

However, the WORM card of this embodiment implements new features to ensure that data can be added to the card but not changed or deleted after being written. Specifically, the WORM card of this embodiment:

Implements new write "filters" that analyze write commands issued by the host device to determine if the write should be performed or not.

Implements a new command in WORM mode for the host device to designate writes as either "open" or "closed." This feature is used along with the write filters to ensure data is not changed after being written.

In one presently preferred embodiment, the implementation of the WORM card follows the same card architecture as other SD card products. Namely, the controller 30 implements the features and algorithms of the card 20 and acts as the interface between the host device 10 and the internal memory device(s) 40, as illustrated in FIG. 1. As noted above, the WORM card does not require any particular memory technology and can be built with OTP, FTP, or read/write memory, for example.

Figure 6:
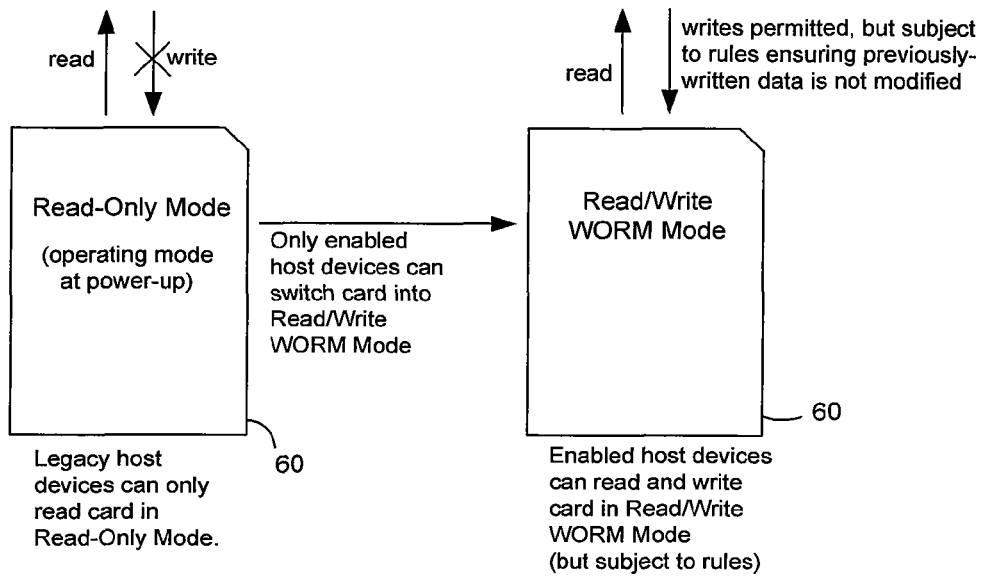
FIG. 6 is an illustration of a dual-mode behavior of a write-once read-many (WORM) memory device of an embodiment.

As shown in FIG. 6, like the OTP card 20 described above, the WORM card 60 in this embodiment implements two modes of operation, where it powers up in a ROM mode, readable by compliant SD host devices, and must be switched into a writable mode before writes can be performed. However, unlike the OTP card 20 described above, the WORM card 60 is switched into a "WORM" mode (instead of an "OTP" mode), which can be performed using the same command but a different argument. In WORM mode, the card 60 implements features to ensure that data can be added to the card 60 but not changed afterward.

Internally, after write commands are accepted by the card 60 (and not rejected by the write filters the card 60 implements to ensure that data is not changed after being written), the card 60 operates similar to the OTP card 20 described above and updates internal data structures for writes that update existing sectors of data. If the underlying memory device(s) are read/write, the now-superceded "original data" sectors may be erased and re-used. If the underlying memory device(s) are OTP, the updated data sectors will never be re-used and will simply never be referenced or accessed again.

The WORM card 60 preferably implements the same Read_Mem_Remaining command as the OTP card 20 for the host to track physical memory consumption. Also, the WORM card's 60 behavior with the Program_CSD and Lock_Unlock commands is preferably the same as the OTP card 20 implementation described above. However, the WORM card 60 preferably implements a new command for the host to mark write operations as either "open" or "closed." This information is used in conjunction with the write filters described below to ensure that data cannot be changed or deleted after being written. (The command code was allocated and defined in the SD Part 1 Physical Layer Specification, version 2.00, section 4.3.12 Command System as part of the switch command protocol, but the data values and format was defined specifically for the WORM card application.) In one embodiment, the host uses this command by specifying either an argument of 01h for "open" or 02h for "closed." Once set, the mode is "sticky" and is not changed until the command is issued again. When the card 60 is first switched into WORM mode, the write mode defaults to "open."

In this embodiment, the WORM card 60 uses the FAT file system to organize files and directories written to the card 60. (This is the file system recommended by the SD specifications, in Part 2 File System Specification.) As was noted in the OTP card description above, a host device that uses the FAT file system will often issue write operations overwriting existing data in the course of performing normal file-system operations. In this embodiment, the WORM card 60 requires the host device to make changes to its FAT file system implementation to satisfy the WORM card data overwrite requirements, but there are some FAT file system operations that overwrite existing data that the WORM card 60 must still support in order to be generally compatible with the FAT file system. Therefore, in this embodiment, the WORM card 60 preferably implements write filters to analyze write commands issued by the host and determine which are legal and should be performed and which are illegal and should be rejected. At a high level, the WORM card 60 allows write operations that are related to adding or creating new files or directories but rejects write operations that change already-written data. The rejected write operations include, for example, those that change file data, such as overwriting, deleting, or appending data to a completed file, as well as those that change a file's (or directory's) file entry, such as renaming the file entry, deleting the file entry (or marking it "deleted," a different operation), changing its attributes (read-only, archive, etc.), or changing the creation or last-modified date and time stamps, and other similar operations.

Figure 7:
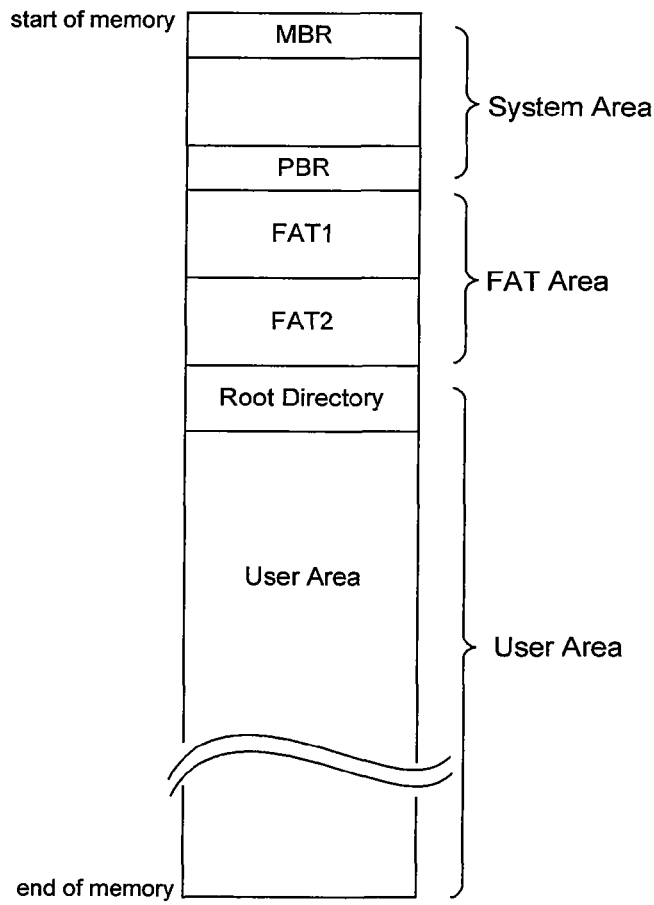
FIG. 7 is an illustration of a logical memory of a write-once read-many (WORM) memory device of an embodiment.

To support the write filters, the WORM card 60 preferably divides its logical memory into three regions, as shown in FIG. 7. The System Area begins at the "Master Boot Record" structure, located at the beginning of memory (logical address 00h), up to and including the "Partition Boot Record" structure. The FAT Area consists of the two copies of the File Allocation Tables and is located immediately after the System Area. The User Area consists of the remainder of the card's memory, beginning at the Root Directory, immediately after the second FAT, up to the end of the card's logical memory. The addresses of the FAT file system structures which mark boundaries between the various regions can be determined by decoding the structures, beginning with the MBR, which is located at logical address 00h.

In this embodiment, the WORM card 60 implements write rules to ensure that data cannot be modified after it has been written. These rules analyze every write command, on a sector-by-sector basis, to determine if each sector should be written as requested by the host. The write rules preferably use three pieces of information when determining if a write should be allowed or rejected: the location of the write operation (System Area, FAT Area, or User Area), whether that sector had been previously written and if it had been written "open" or "closed," and the data pattern the host is attempting to write.

In one presently preferred embodiment, the write rules implemented by the WORM card 60 are as follows:

No writes are allowed to the System Area, whether open or closed.

Writes to the FAT area can only change unprogrammed cluster entries. Programmed cluster entries cannot be changed to any value, including 0000h (the unprogrammed value). Cluster entries are two-byte values aligned on even byte addresses; if any bit of a cluster entry is non-zero, then that cluster entry is considered programmed and cannot be changed.

In one presently preferred embodiment, writes to the User Area are subject to the following rules:

Data can only be modified in multiples of 32-byte quantities (the size of a directory entry), aligned on 32-byte addresses. If any bit of a 32-byte group is non-zero, then that 32-byte group is considered programmed and cannot be changed.

If a sector (512 bytes) has been previously written with any non-zero data, additional data to that sector can only be appended (written after) in programmed 32-byte quantities. If a sector has one or more 32-byte quantities previously programmed such that there is a "gap" of one or more 32-byte quantities that are unprogrammed (all 00h values), then those intervening blank 32-byte quantities cannot be programmed.

If a sector has previously been written "closed" then that sector can never be written to again, regardless of the location or data pattern requested by the host.

If the host violates any of these rules, the card will return a Write Protection Violation error.

Of course, the above rules are merely examples, and other rules can be used. For example, the rule that data can only be modified in multiples of 32-byte quantities may be unnecessarily restrictive in some embodiments, and it may be better to allow updates to previously-programmed 32-byte quantities if those 32-byte quantities had left the "starting cluster" and/or "file length" fields blank and only to update those fields and not any others. This modification would make it easier for host devices to support a WORM card because they would have to make fewer changes to their existing FAT file system implementation. As another example, the rule that data can only be appended in 32-byte quantities may be unnecessary if the WORM card relies on the host device to properly follow the rules. For a host device that follows the recommended implementation, this situation should not arise.

In addition, note that the above rules describe a preferred embodiment to support a "FAT16" FAT file system; similar rules can be developed for FAT12, FAT32, and exFAT file systems, which are also commonly used for memory devices.

The WORM card 60 preferably requires the host device to modify its FAT file system implementation to satisfy the write rules. The WORM card 60 preferably requires the host device to write the file data (the data a file contains, as opposed to file-system related data such as the file name) as a "closed" write; by doing this, the file data can never be changed, regardless of the contents of the file. If the host does not write the file data as "closed," and the file data contained one or more blank sectors (all 00h values), then a malicious device could corrupt the file by changing that sector such that some of the 00h values were changed to other values. The file-system related information should be written "open" because those sectors might later be updated, since a sector might contain information on more than one file.

Some of the following claims may state that a component is operative to perform a certain function or is configured for a certain task. It should be noted that these are not restrictive limitations. It should also be noted that the acts recited in the claims can be performed in any order—not necessarily in the order in which they are recited. Also, it is intended that the foregoing detailed description be understood as an illustration of selected forms that the invention can take and not as a definition of the invention. It is only the following claims, including all equivalents, that are intended to define the scope of this invention. Finally, it should be noted that any aspect of any of the preferred embodiments described herein can be used alone or in combination with one another.

What is claimed is:

1. A memory device comprising:
   a memory; and
   a controller in communication with the memory, wherein the controller is operative to:
   power-up in read-only mode;
   receive a command from a host device to switch to a write-once, read-many (WORM) mode;
   in response to the command from the host device, switch from the read-only mode to the WORM mode; and
   while in the WORM mode:
   receive a write command from the host device; and
   determine if the write command should be performed.

2. The memory device of claim 1, wherein the command from the host is in compliance with a switch command protocol defined in section 4.3.10 of SecureDigital (SD) Part 1 Physical Layer Specification, version 2.00.

3. The memory device of claim 1, wherein the read-only mode is compliant with the ROM card type definition in SecureDigital (SD) Part 1 Physical Layer Specification version 2.00, Supplementary Notes, version 1.00.

4. The memory device of claim 3, wherein the memory device is readable in SecureDigital (SD) compliant hosts upon power up.

5. The memory device of claim 1, wherein the controller is operative to analyze one or more of the following to determine if the write command should be performed: a memory location in which the data is to be written, a data pattern, and whether a memory location in which the data is to be written was designated as open or closed.

6. The memory device of claim 1, wherein the controller is operative to determine that the write command should be performed if the write command adds or creates new files or directories.

7. The memory device of claim 1, wherein the controller is operative to determine that the write command should not be performed if the write command attempts to change previously-written data.

8. The memory device of claim 1, wherein the memory comprises a system area comprising a master boot record and a partition boot record, and wherein the controller is operative to determine that the write command should not be performed if the write command attempts to write data in the system area.

9. The memory device of claim 1, wherein the memory comprises a file allocation table (FAT) area, and wherein the controller is operative to determine that the write command should be performed only if the write command attempts to write data to an un-programmed cluster entry in the FAT.

10. A memory device comprising:
a memory; and
a controller in communication with the memory, wherein the controller is operable in first and second modes of operation, wherein in the first mode of operation, the memory device operates in a read-only mode, and wherein in the second mode of operation, the memory device operates in a write-once, read-many (WORM) mode;
wherein the controller is operative to:
receive a command from a host in communication with the memory device to write data to the memory; and
analyze the write command to determine if the write command should be performed;
wherein the memory comprises a user data area, and wherein the controller is operative to determine that the write command should not be performed if the write command attempts to write data to a 32-byte area that has at least one non-zero entry.

11. The memory device of claim 1, wherein the memory comprises a user data area, and wherein the controller is operative to determine that the write command should be performed if the write command attempts to write data to a 32-byte area that has a blank starting cluster or file length field and only if the write command is updating those fields.

12. A memory device comprising:
a memory; and
a controller in communication with the memory, wherein the controller is operable in first and second modes of operation, wherein in the first mode of operation, the memory device operates in a read-only mode, and wherein in the second mode of operation, the memory device operates in a write-once, read-many (WORM) mode;
wherein the controller is operative to:
receive a command from a host in communication with the memory device to write data to the memory; and
analyze the write command to determine if the write command should be performed;
wherein the memory comprises a user data area, and wherein the controller is operative to determine that the write command should be performed if the write command is appending a 32-byte area to a previously-programmed 512-byte sector.

13. The memory device of claim 1, wherein the memory comprises a user data area, and wherein the controller is operative to determine that the write command should not be performed if the write command is to write data in an area that was designated as closed.

14. The memory device of claim 1, wherein the write command designates the write either as open, in which case the data can later be over-written, or as closed, in which case the data cannot later be over-written.

15. The memory device of claim 14, wherein the open/closed designation is in compliance with a switch command protocol defined in section 4.3.12 of SecureDigital (SD) Part 1 Physical Layer Specification, version 2.00.

16. The memory device of claim 14, wherein the controller is operative to apply the open/closed designation to subsequent write commands until the designation is changed.

17. The memory device of claim 1, wherein the controller is operative to:
receive a command from a host in communication with the memory device to track consumption of the memory; and
send the host a response to the command.

18. The memory device of claim 17, wherein the response to the command comprises an amount of remaining physical space in a main memory area used both for file data and for file system operations and an amount of remaining physical space in a reserved memory area used only for file system operations.

19. The memory device of claim 17, wherein the response to the command is in compliance with a switch command protocol defined in section 4.3.10 of SecureDigital (SD) Part 1 Physical Layer Specification, version 2.00.

20. The memory device of claim 1, wherein the controller is further to perform one or both of the following commands only once: a command to program a card status defaults (CSD) register in the memory and a command to set a memory device password.

21. The memory device of claim 1, wherein the controller does not support a command to perform a force erase operation to erase the memory if a memory device password is forgotten.

22. The memory device of claim 1, wherein the memory device is a SecureDigital (SD) memory card.

23. The memory device of claim 1, wherein the memory comprises a one-time programmable (OTP) memory.

24. The memory device of claim 1, wherein the memory comprises a few-time programmable (FTP) memory.

25. The memory device of claim 1, wherein the memory comprises a re-writable memory.

26. A method for using a memory device, the method comprising:
performing the following in a controller of a memory device comprising a memory:
powering-up in read-only mode;
receiving a command from a host device to switch to a write-once, read-many (WORM) mode;
in response to the command from the host device, switching from the read-only mode to the WORM mode; and
while in the WORM mode:
receiving a write command from the host device; and
determining if the write command should be performed.

27. The method of claim 26, wherein the command from the host is in compliance with a switch command protocol defined in section 4.3.10 of SecureDigital (SD) Part 1 Physical Layer Specification, version 2.00.

28. The method of claim 26, wherein the read-only mode is compliant with the ROM card type definition in SecureDigital (SD) Part 1 Physical Layer Specification version 2.00, Supplementary Notes, version 1.00.

29. The method of claim 28, wherein the memory device is readable in SecureDigital (SD) compliant hosts upon power up.

30. The method of claim 26, wherein analyzing the write command comprises analyzing one or more of the following: a memory location in which the data is to be written, a data pattern, and whether a memory location in which the data is to be written was designated as open or closed.

31. The method of claim 26 further comprising determining that the write command should be performed if the write command adds or creates new files or directories.

32. The method of claim 26 further comprising determining that the write command should not be performed if the write command attempts to change previously-written data.

33. The method of claim 26, wherein the memory comprises a system area comprising a master boot record and a partition boot record, and wherein the method further comprises determining that the write command should not be performed if the write command attempts to write data in the system area.

34. The method of claim 26, wherein the memory comprises a file allocation table (FAT) area, and wherein the method further comprises determining that the write command should be performed only if the write command attempts to write data to an un-programmed cluster entry in the FAT.

35. A method for using a memory device, the method comprising:
performing the following in a controller of a memory device comprising a memory:
operating the memory device in a read-only mode when the controller is in a first mode of operation;
operating the memory device in a write-once, man WORM mode when the controller is in a second mode of operation;
receiving a command from a host in communication with the memory device to write data to the memory; and
analyzing the write command to determine if the write command should be performed;
wherein the memory comprises a user data area, and wherein the method further comprises determining that the write command should not be performed if the write command attempts to write data to a 32-byte area that has at least one non-zero entry.

36. The method of claim 26, wherein the memory comprises a user data area, and wherein the method further comprises determining that the write command should be performed if the write command attempts to write data to a 32-byte area that has a blank starting cluster or file length field and only if the write command is updating those fields.

37. A method for using a memory device, the method comprising:
performing the following in a controller of a memory device comprising a memory:
operating the memory device in a read-only mode when the controller is in a first mode of operation;
operating the memory device in a write-once, read-many (WORM) mode when the controller is in a second mode of operation;
receiving a command from a host in communication with the memory device to write data to the memory; and
analyzing the write command to determine if the write command should be performed;
wherein the memory comprises a user data area, and wherein the method further comprises determining that the write command should be performed if the write command is appending a 32-byte area to a previously-programmed 512-byte sector.

38. The method of claim 26, wherein the memory comprises a user data area, and wherein the method further comprises determining that the write command should not be performed if the write command is to write data in an area that was designated as closed.

39. The method of claim 26, wherein the write command designates the write either as open, in which case the data can later be over-written, or as closed, in which case the data cannot later be over-written.

40. The memory device of claim 39, wherein the open/closed designation is in compliance with a switch command protocol defined in section 4.3.12 of SecureDigital (SD) Part 1 Physical Layer Specification, version 2.00.

41. The memory device of claim 39 further comprising applying the open/closed designation to subsequent write commands until the designation is changed.

42. The method of claim 26 further comprising:
receiving a command from a host in communication with the memory device to track consumption of the memory; and
sending the host a response to the command.

43. The method of claim 42, wherein the response to the command comprises an amount of remaining physical space in a main memory area used both for file data and for file system operations and an amount of remaining physical space in a reserved memory area used only for file system operations.

44. The method of claim 42, wherein the response to the command is in compliance with a switch command protocol defined in section 4.3.10 of SecureDigital (SD) Part 1 Physical Layer Specification, version 2.00.

45. The method of claim 26 further comprising perform one or both of the following commands only once: a command to program a card status defaults (CSD) register in the memory and a command to set a memory device password.

46. The method of claim 26, wherein the controller does not support a command to perform a force erase operation to erase the memory if a memory device password is forgotten.

47. The method of claim 26, wherein the memory device is a SecureDigital (SD) memory card.

48. The method of claim 26, wherein the memory comprises a one-time programmable (OTP) memory.

49. The method of claim 26, wherein the memory comprises a few-time programmable (FTP) memory.

50. The method of claim 26, wherein the memory comprises a re-writable memory.

* * * * *

UNITED STATES PATENT AND TRADEMARK OFFICE
CERTIFICATE OF CORRECTION

PATENT NO. : 8,266,366 B2
APPLICATION NO. : 12/421238
DATED : September 11, 2012
INVENTOR(S) : Fruin et al.

It is certified that error appears in the above-identified patent and that said Letters Patent is hereby corrected as shown below:

In the Claims

In column 13, claim 35, lines 16-17, after "in a write-once," replace "man WORM" with --read-many (WORM)--.

Signed and Sealed this
Thirtieth Day of April, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,266,366 B2 | Page 1 of 1 |
| APPLICATION NO. | : 12/421238 | |
| DATED | : September 11, 2012 | |
| INVENTOR(S) | : Fruin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 327 days.

Signed and Sealed this
Twenty-sixth Day of August, 2014

Michelle K. Lee
*Deputy Director of the United States Patent and Trademark Office*